US005669019A

United States Patent [19]
Woltz et al.

[11] Patent Number: 5,669,019
[45] Date of Patent: Sep. 16, 1997

[54] WATERPROOF LARGE CAPACITY FILM MAGAZINE

[75] Inventors: Robert L. Woltz, Laguna Beach; Richard D. Balentine, Costa Mesa, both of Calif.

[73] Assignee: Robert Woltz Associates, Inc., Newport Beach, Calif.

[21] Appl. No.: 245,462

[22] Filed: May 17, 1994

[51] Int. Cl.⁶ .............................. G03B 17/08; G03B 1/00
[52] U.S. Cl. ................................................. 396/25; 396/411
[58] Field of Search .......................... 354/64, 173.1, 354/173.11, 212, 215, 217, 218; 396/25, 29, 387, 411

[56] References Cited

U.S. PATENT DOCUMENTS

| | | | |
|---|---|---|---|
| 3,236,167 | 2/1966 | Lode | 354/64 |
| 3,641,893 | 2/1972 | Takahama | 356/242 |
| 3,832,725 | 8/1974 | Cook | 354/64 |
| 4,041,507 | 8/1977 | Ko et al. | 354/64 |
| 4,100,553 | 7/1978 | Danel | 354/64 |
| 4,310,233 | 1/1982 | Okuyama et al. | 354/212 |
| 4,312,580 | 1/1982 | Schwomma et al. | 354/64 |
| 4,375,323 | 3/1983 | Inagaki et al. | 354/64 |
| 4,655,574 | 4/1987 | Fields | 354/212 |
| 4,671,636 | 6/1987 | Malloy Desormeaux | 354/214 |
| 4,679,926 | 7/1987 | Suzuki et al. | 354/173.11 |
| 4,945,369 | 7/1990 | Fiorda | 354/173.1 |
| 4,974,787 | 12/1990 | Arai et al. | 354/212 |
| 5,005,035 | 4/1991 | Pagano | 354/206 |
| 5,055,867 | 10/1991 | Harvey | 354/173.11 |
| 5,075,707 | 12/1991 | Shibayama et al. | 354/173.1 |
| 5,239,324 | 8/1993 | Ohmura et al. | 354/64 |
| 5,258,794 | 11/1993 | Woltz et al. | 354/173.1 |
| 5,285,894 | 2/1994 | Kamata et al. | 354/64 |
| 5,294,988 | 3/1994 | Wakabayashi et al. | 354/64 |
| 5,337,108 | 8/1994 | Kaihara et al. | 354/218 |

*Primary Examiner*—Safet Metjahic
*Assistant Examiner*—Nicholas J. Tuccillo
*Attorney, Agent, or Firm*—Walter A. Hackler

[57] ABSTRACT

A waterproof, large capacity film magazine is provided for use with an existing camera which includes outer magazine housing for sealably engaging an existing camera body and film handling apparatus disposed in the outer magazine for transporting film across a focal plane of the existing camera body without passing the film under, around, or through any element of the existing camera.

1 Claim, 5 Drawing Sheets

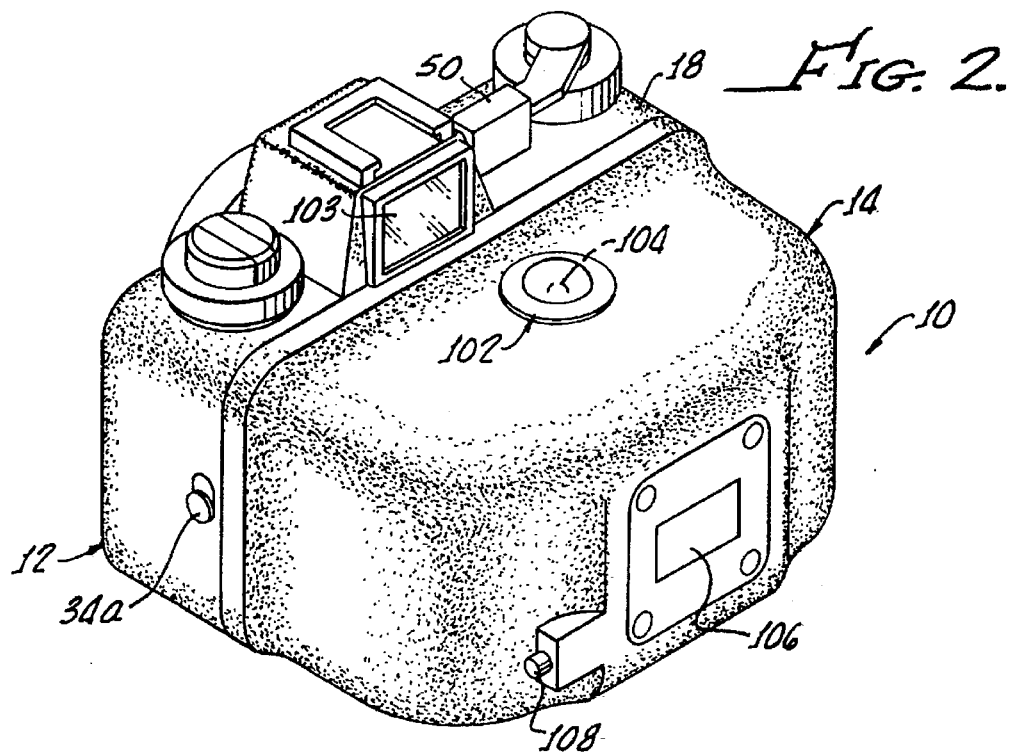
FIG. 2.
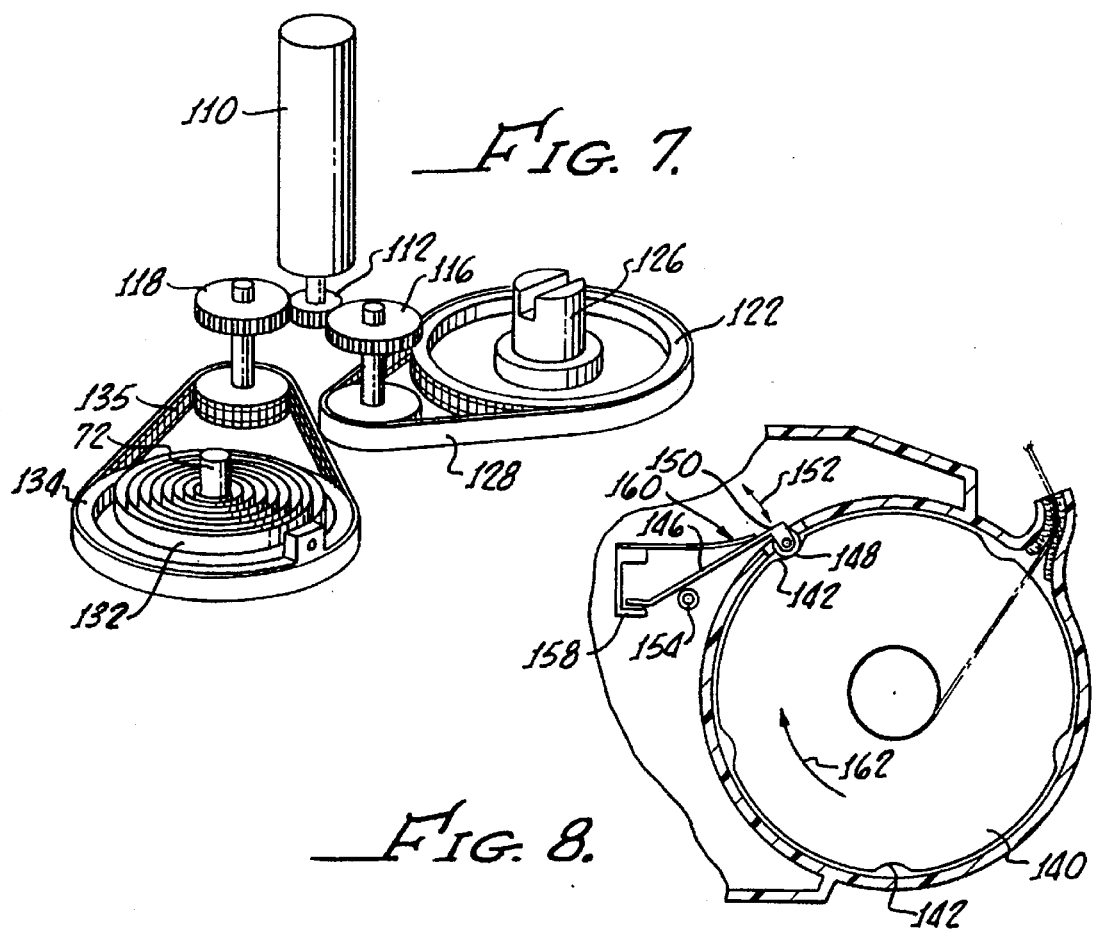
FIG. 7.
FIG. 8.

WATERPROOF LARGE CAPACITY FILM MAGAZINE

The present invention generally relates to film handling systems for cameras and is more particularly directed to a waterproof, large capacity film magazine.

Camera equipment manufactured for general use when recording images for print, reproduction, or slide projection is designed for handling film rolls having a relatively small capacity. For example, 35 mm film, a popular medium in today's cameras, is supplied in rolls of 12, 24, 36 exposures.

Limited exposures provided by these film rolls does not provide any inconvenience to the majority of users since the supply of film is ubiquitous, and the typical photographer's environment is amenable to repeated loading of camera with rolls of film.

Such is not the case, however, in many situations in which the photpgrapher may not find a handy supply of film, i.e., backpacking, mountain climbing, etc., or the environment, such as presented to a SCUBA diver, for example, in which the replacement of exposed rolls of film by fresh rolls of film is virtually impossible.

In these situations, there is without a doubt a need for a camera system having a large film capacity.

This problem has been addressed for underwater use in U.S. Pat. Nos. 4,945,369, entitled "Film Magazine for Underwater Cameras," and 5,258,794, entitled "Extended Capacity Film Magazine".

Both of the referenced patents are directed to a film magazine suitable for use with underwater 35 mm cameras such as manufactured by Nikon Corporation and sold under the brand name Nikonos V. While the Nikonos camera is designed and therefore suitable for underwater use, it is limited to maximum film size or capacity of only a 36-exposure roll of film.

The film magazines taught in the referenced patents provide for a large capacity film supply and are otherwise suitable for use with the Nikonos camera, however, there is considerable difficulty in the film handling procedures for threading film from the extended magazine through the existing camera and back into the large capacity magazine.

These problems are immediately evidenced from FIG. 1 of U.S. Pat. No. 4,945,369 and FIG. 2 of U.S. Pat. No. 5,258,794. Both of these magazines suffer from the same inconvenience mandated by the required use of the camera's pressure plate 24, 78 respectively disclosed in '369 and '794.

Further inconvenience is mandated by the magazine taught in '794 due to its use of the camera takeup spool 84 in advancing the film. Thus when a new, unexposed roll of film is loaded into the magazine and camera combination set forth in the referenced patents, elaborate threading from the camera magazine through elements of the camera and back into the magazine are required. Even when the magazine and camera are hingeably attached to one another, as shown in FIG. 1 of '369, the procedure presents an awkward situation to the user. This is of particular disadvantage if the elaborate loading procedure leads to misalignment of the film which is manifest to the user when he attempts to use the camera underwater. This disappointing event naturally requires resurfacing of the diver and a repeated reloading procedure. Further, the structure of this prior art may also result in excessive wear and possible premature failure of the camera takeup slip clutch which drives the magazine thereby causing the film advance to become inoperable.

In addition, if the photographer does not wish to expose all of the film in the extended magazine, removal of exposed film is inhibited because of the required threading of film between the magazine and the camera. That is, if the exposed film is to be removed from the magazine without shooting all of the supply when the camera is separated to remove the exposed film, a large amount of film is obviously exposed to daylight, unless the procedure is performed in a darkroom. Thus, the shooting of partial rolls of film in the camera/magazine systems set forth in the referenced patents is not facilitated. Compounding this problem is the fact that the prior art device includes two distinctly different cassettes thereby making the partial exposure removal more cumbersome and expensive.

The present invention solves the problem of the hereinabove referenced patents by providing a large capacity magazine which, when loaded with film, is ready to use upon simple coupling to the camera with no additional film handling procedures being required when the loaded magazine is applied to the camera for use. Importantly, the present invention may be utilized with almost any camera with proper fitting hardware.

SUMMARY OF THE INVENTION

A waterproof, large capacity film magazine in accordance with the present invention for use with an existing camera generally includes outer magazine housing for sealably engaging an existing camera body and film handling means, disposed in the outer magazine housing, for transporting film across a focal plane of the existing camera body without passing the film under, around, or through any element of the existing camera.

More particularly, in accordance with the present invention, there is provided means for enabling an existing lever, or motor, on the existing camera to advance the film past the focal plane on a frame-by-frame basis. Thus the present invention provides for a film magazine adapted for using the advancing mechanism in an existing camera without the requirement of passing the film through or around any element of the camera.

This means for enabling the existing lever, or motor, of an existing camera to advance film comprises a retractable roller which provides means for guiding a portion of the film against a drive sprocket disposed in the existing camera and connected to the existing lever, or motor. More specifically, arm means are provided for moving the retractable roller to engage the film portion with the drive sprocket when the outer magazine housing engages the existing camera body.

In particular, the film handling means includes an inner housing disposed within the magazine housing with the inner housing having an integral cavity for receiving film and means for removably supporting a film supply cassette. The means for supporting a film supply cassette is spaced apart from the integral cavity in order to enable film, extending therebetween, to interface the camera body for exposure to focused images. Similarly, means are provided and disposed within the integral cavity for spooling film after exposure.

Additionally, drive means disposed in the inner housing is provided for both intermittently spooling film on the spindle means as the camera lever is moved and also continuously transporting film from the spindle means to the film supply cassette upon rewind.

A spring-loaded pressure plate mounted on the inner housing provides a means for guiding the film across the focal-plane of the camera body. It is important to note that the pressure plate is attached to the housing and not to the camera for this structure, which is completely different from prior art devices, functions in a manner to facilitate film handling so that heretofore steps of threading film through a camera are no longer necessary.

In addition, means may be provided for counting a number of frames of film intermittently passed by the focal plane which may include a lobed cam rotatably mounted with the spindle means and microswitch means for determining the passage of cam lobes thereby.

More particularly, the drive means may include a spring connected for rotation of the spindle means for both intermittently rotating the spindle means for spooling the film and for providing tension on the film extending between the retractable roller and the spindle means.

A single motor may be provided as part of a drive means and gear motor drive means may be provided for causing the motor to wind the spring means when rotating in one direction and continuously transport film from the spindle means to the film supply cassette when rotating in an opposite direction.

BRIEF DESCRIPTION OF THE DRAWINGS

The advantages and features of the present invention will be better understood by the following description when considered in conjunction with the accompanying drawings in which:

FIG. 2 is a perspective rear view of the outer magazine, generally showing the control button and observation window;

FIG. 7 is a diagrammatic perspective view showing the drive mechanism for providing takeup of film, tension thereon, and rewinding of the film;

FIG. 8 shows a mechanism for detecting film movement and activation of a frame counter;

DETAILED DESCRIPTION

Figure 1:
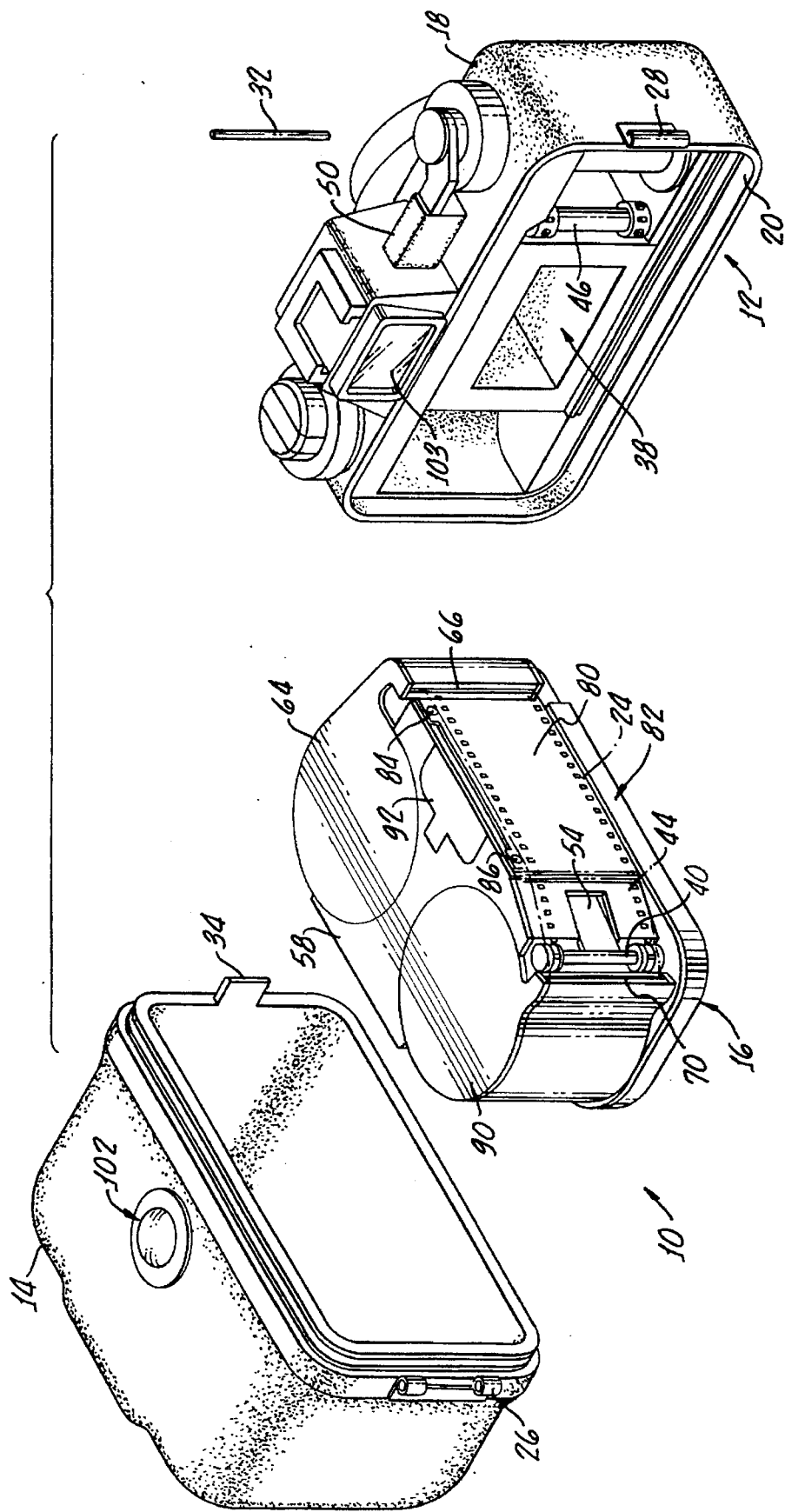
FIG. 1 is an exploded perspective view of the waterproof, large capacity film magazine in accordance with the present invention, generally showing a camera body, an outer magazine housing and a film handling assembly.

Turning now to FIG. 1, there is shown a waterproof, large capacity film magazine 10 in accordance with the present invention for use with a camera 12 such as, for example, a Nikonos V camera, as hereinabove described.

Magazine 10 generally comprises an outer magazine housing 14 which provides a means for sealably engaging a camera body 18 by means of a pressure seal 20 in a conventional manner.

The present magazine is described as one for holding up to about 35 feet of 35 mm camera film which is equivalent to about 180 exposures. Naturally, the capacity of the magazine can be changed through sizing thereof for more or less capacity.

FIG. 1 dramatically illustrates an important feature of the present invention which overcomes the disadvantage of prior art systems, as hereinbefore described. Namely, as shown in FIG. 1, the film 24 when loaded into the film handling assembly 16 is ready for use with the camera 12 without the necessity of threading the film through, under or between any element of the camera 12. This feature will be discussed at length hereinafter.

The housing 14 may be comprised of any suitable material such as aluminum coated with a conventional finish as may be necessary for an underwater environment. When used with the camera body 12, the camera 12 back (not shown) is removed, along with a camera pressure plate and back (not shown) and a hinge member 26 is provided for coupling with a standard camera hinge member 28 by means of a pin 32.

Thus, the present magazine 10 is usable with the camera 12 without any modification of the camera 12 except for the removal of its existing camera pressure plate (not shown) which is typically retained to the camera body by two screws (not shown). A latch 34 is provided on the housing 14 for coupling with the camera body 12 utilizing an existing mating latch component 34A of the camera 12, as shown in FIG. 2.

The film handling assembly 16 provides a means for transporting the film 24 across a focal plane 38 of the existing camera body 20 without passing the film 24 under, around, or through any element of the existing camera 12.

A retractable roller 40 is provided for guiding a portion 44 of the film 24 against a drive sprocket 46 disposed in the camera 12 and connected to an existing film advance lever 50 in a conventional manner. In this manner, the roller 40 provides a means for enabling the existing lever 50 to advance the film 24 past the focal plane 38 on a frame-by-frame basis. As will be hereinafter discussed in greater detail, a roller arm 54 provides means for moving the retractable roller 40 to engage the film portion 44 with the drive sprocket 46 when the outer magazine 14 engages the existing camera body 20.

Figure 3:
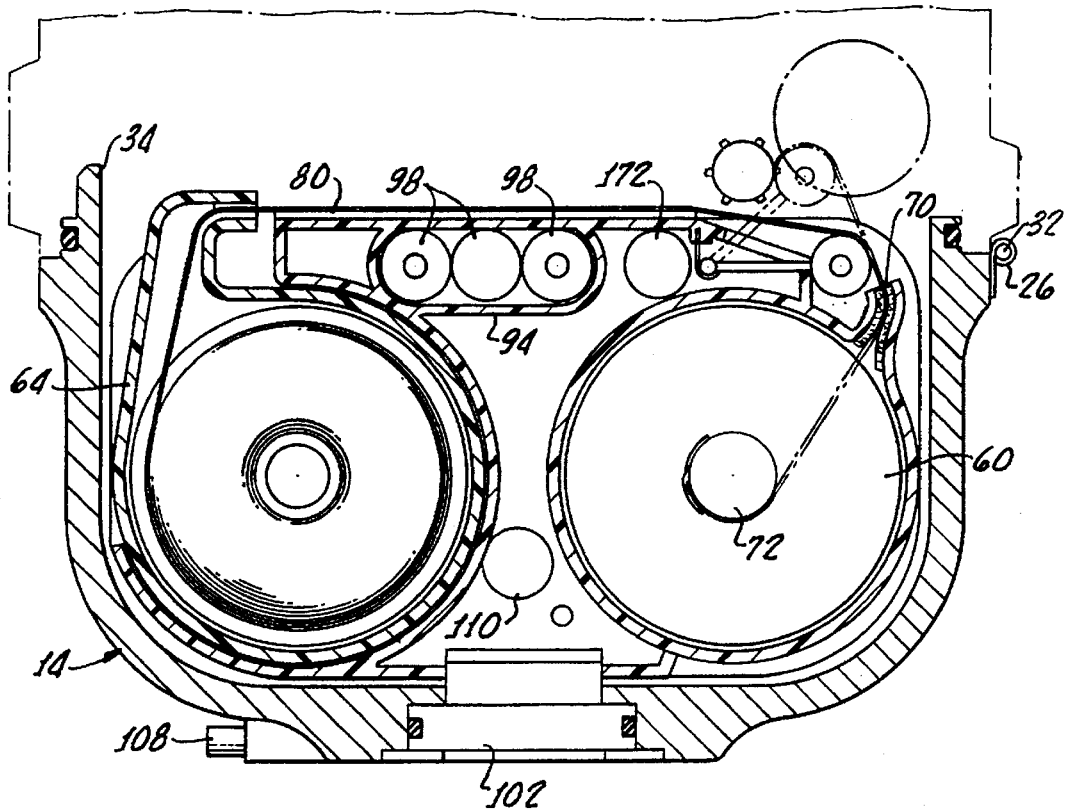
FIG. 3 is a horizontal cross-section view taken along the center of the magazine.

The film handling assembly 16 generally includes an inner housing 58 with an integral cavity 60 (see FIG. 3) which provides a means for receiving the film 24. The inner housing 58 also provides a means for removably supporting a film supply cassette 64 which may be of conventional design having a generally cylindrical shape with a velvet-lined film exit slot 66. As shown in FIGS. 1 and 3, the film supply cassette 64 and the cavity 60 are disposed in a spaced apart relationship by the inner housing 58 in order to enable the film 24 extending therebetween to interface the camera body 12 for exposure to focused images.

The inner housing 58 includes a velvet-lined entrance slot 70 for introducing the film 24 into the cavity 60 and around a spindle 72 disposed within the integral cavity 60 for spooling of the film 24.

Figure 4:
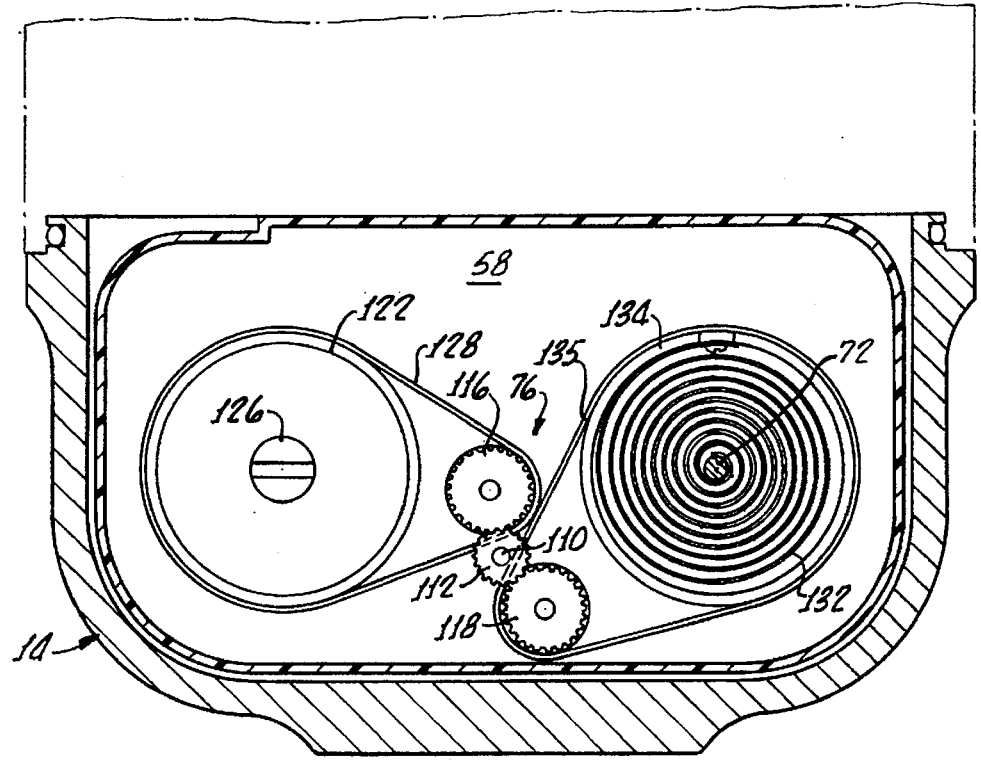
FIG. 4 is a horizontal cross-section view of the housing and film handling assembly showing the drive mechanism.

As shown in FIG. 4, drive means disposed in the inner housing 58 is provided for both intermittently spooling the film 24 on the spindle 72 as the camera lever 50 is actuated to advance the film 24 past the focal plane 38 of the camera body 20 and, in addition, continuously transporting the film 24 from the spindle 72 to the film supply cassette 64 during a rewind operation, as will be hereinafter discussed in greater detail.

Also shown in FIGS. 1 and 3, a spring-loaded pressure plate 80 disposed on a front portion 82 of the inner housing 58 provides a means for guiding a film 24 across the focal plane 38 of the camera body 20. This pressure plate 80 functions in a manner similar to the original plate (not shown) of the camera 20 but, of course, since it is not disposed in the camera, it is not necessary for the film 24 to be threaded through the camera 20 in order to effect operation of the pressure plate in guiding and supporting the film 24. A conventional set of screws and springs indicated at 84, 86 may be utilized to support the pressure plate 80 on the inner housing front 82 in a resilient fashion, as is well-known in the art.

A lid 90 removably disposed over the film takeup cavity 60 enables access to the spool for threading of the film 24 therearound, the spool being provided with conventional slots or the like (not shown) for releasably gripping the film 24 to enable spooling thereof around the spindle 72. The lid 90 functions to prevent light from entering the cavity 60 when the film handling assembly is removed from the outer housing 14, which may occur in the event the user only wishes to remove and develop only a portion of the film 24, as will be hereinafter discussed in greater detail. Also shown in FIG. 1 is a battery compartment lid 92 removably positioned over a battery compartment 94, as shown in FIG. 3, the latter being sized for accommodating the appropriate number of batteries 98 for powering control electronics (not shown) which consist of logic circuitry that controls the power, film advance, film rewind, frame counter and display, and a water sensor 100, see FIG. 5.

Figure 5:
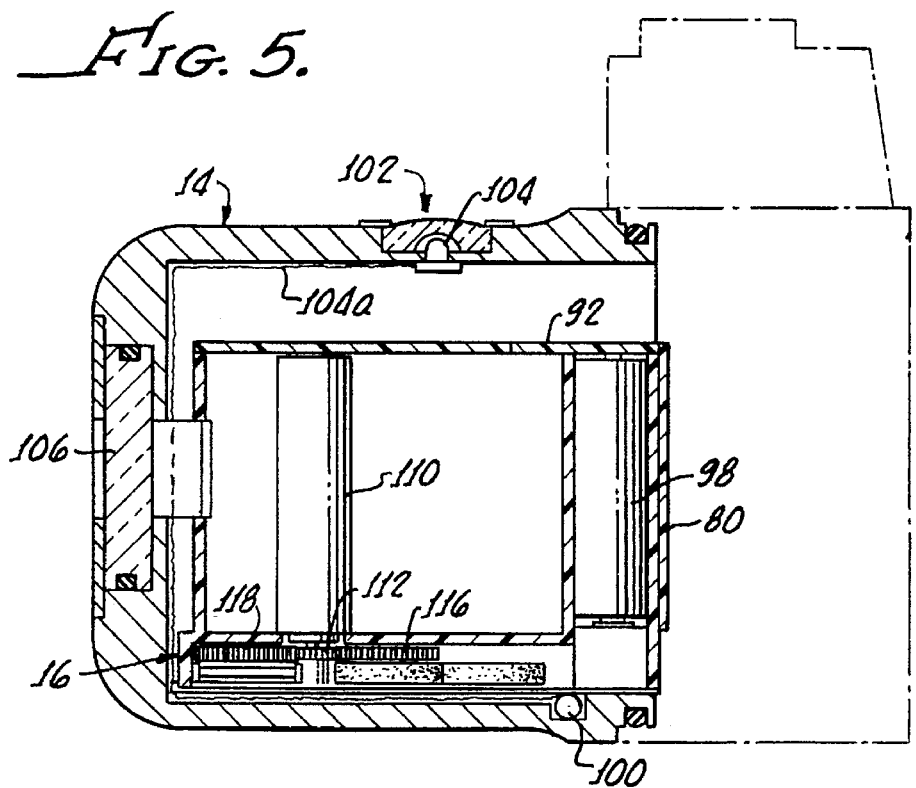
FIG. 5 is a vertical cross-section view of the embodiment shown in FIG. 3.

Referring also to FIGS. 2 and 5, a clear viewing dome 102 disposed over an LED 104 on the outer housing 14 provides a means for emitting a visual alarm into a users field of vision when the user is observing an image through a viewfinder 103 disposed on the camera 12, the LED 104 being connected to the water sensor 100 by means of wires 104A.

The display 106 may be any conventional electronic display system, for example, incorporating light-emitting diodes (LED), and the operation of the electronics may be in any conventional manner as, for example, as set forth in U.S. Pat. No. 5,258,794, the disclosure of which is incorporated herein, in its entirety, by this specific reference thereto. Preferably, the display utilizes a non-magnifying window in order that when viewed above water no distortion occurs. This facilitates easy "above water" monitoring of the film supply. By utilizing a self illuminating display the contrast between numbers and background is increased for easy readability.

In addition, a control button 108 may be utilized to control magazine function through the control electronics in a manner similar to that set forth in U.S. Pat. No. 5,258,794.

Figure 6:
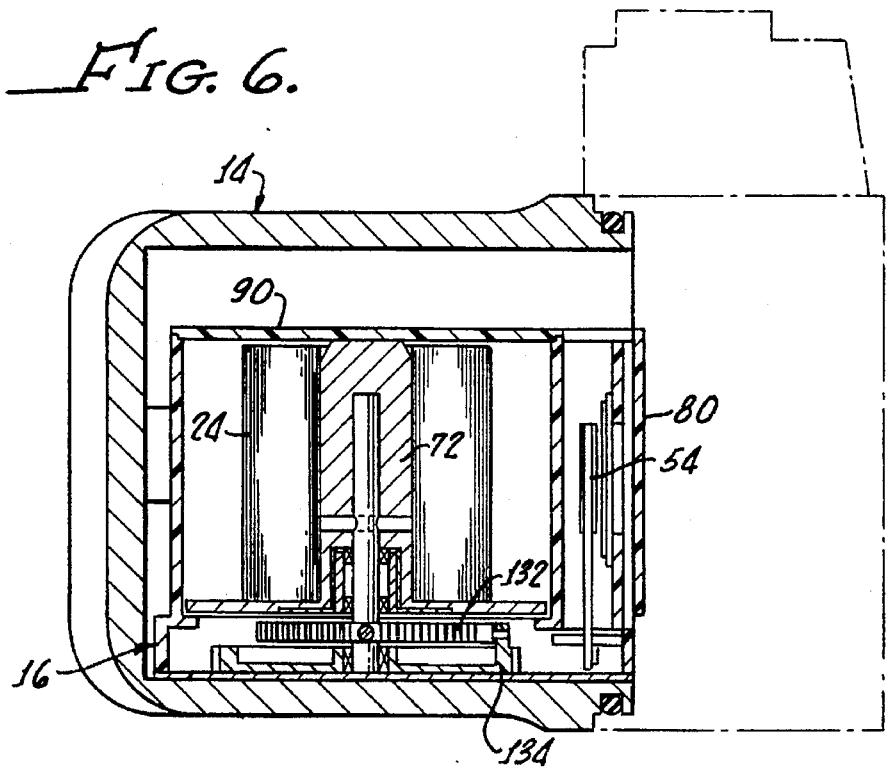
FIG. 6 is a vertical cross-section view of the embodiment shown in FIG. 4.

Turning now to FIG. 4, the drive means 76 generally includes a single gearmotor 110 which engages through a coaxially mounted gear 112, two clutch/gear motor drives 116, 118. As more clearly shown in FIGS. 5-7, one clutch/gear motor 116 drives a pulley 122 connected to a supply roll spindle 126 which engages the film supply cassette 64 (not shown in FIG. 7) through a belt 128.

The clutch/gear drive 118 is utilized to wind a coil spring 132, interconnected to the spindle 72, through a pulley 134 and drive belt 135.

The clutch/gear motor drive 116, 118 are selected to enable the motor to wind the spring 132 rotating in one direction and continuously rotating the supply roll spindle 126 to continuously wind exposed film thereabout when the motor 110 is rotating in an opposite direction.

In operation, the film 24 is advanced by the lever 50 as it rotates the six-toothed sprocket 46. In this operation, the retractable roller 54 guides the film 24 snugly against the sprocket 46 and tension in the film 24 is maintained by the spring 132.

Thus, continuous operation of the motor 110 is not required to maintain the tension of the film or to take up film into the cavity 60 and around the spindle 72 as film is advanced by the sprocket 46 when the lever 50 is operated. The film 24 is firmly attached to the supply spindle 126 so that it will not separate therefrom under normal operation. When all the film 24 is transported from the supply cassette 64 to the spindle 72, the camera cocking lever 50 will stall in the normal manner. This alerts the user that the end of the film roll has been reached and that rewinding of the film should be performed.

The rewind functions through the control button 106 and the electronics which cause the retractable roller 40 to retract and activate the motor for transporting from the spindle 72 and back into the supply cassette. In addition, a microswitch (not shown) is provided for causing retraction of the roller 54 through the electronics when the outer housing 14 is detached from the camera body 20.

Turning now to FIG. 8, there is shown a cam 140 having lobes 142 thereon and disposed above the spring 132 which may be utilized to detect movement of the spindle 72 for providing a signal to the electronics for causing the spring 132 to be wound by the motor 110 and also for providing a signal to the electronics to indicate the number of exposures that have passed by the focal plane 38 and have been taken up on the spindle 72. The cam 140 may also serve as a film edge guide on the spindle.

This operation is effected through a lever 146 having a roller 148 attached to one end thereof which moves the lever 146 in motion indicated by the arrow 152, as the roller 148 falls into each of the cam lobes 142.

In turn, the motion of the lever 146 pivoting about a point 154 actuates a contact switch 158 which is interconnected to electronics in a conventional manner (not shown). A leaf spring 160 ensures that the roller 148 maintains engagement with the cam 140 and moves thereagainst and into the lobes 142 as the cam is rotated, as shown by the arrow 162.

Figure 9:
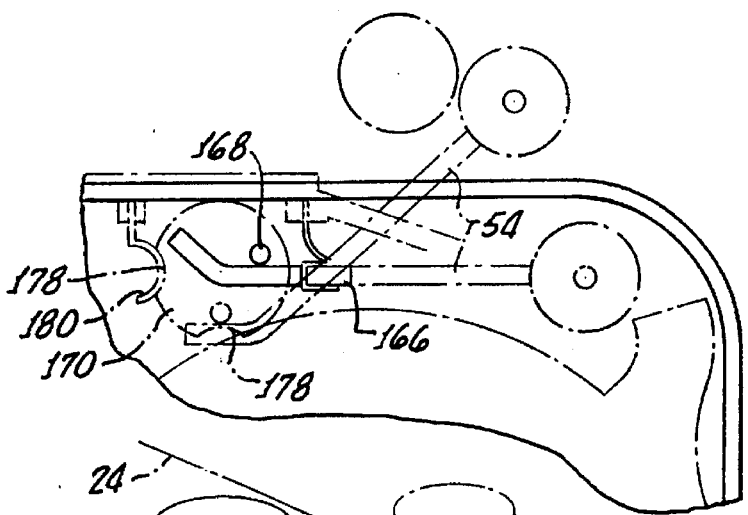
FIG. 9 is an enlarged view showing engagement of a retractable roller in two positions, one outward position for causing film to engage a drive sprocket of the camera and two, a retracted position.
Figure 10:
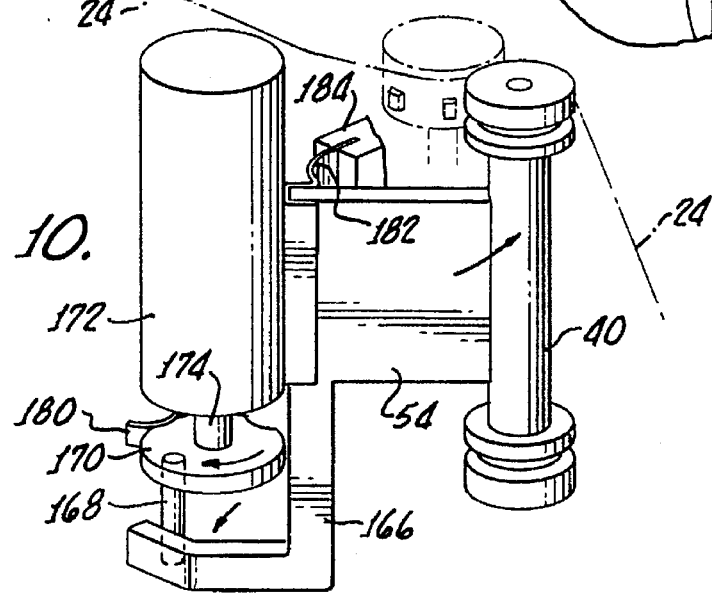
FIG. 10 is a perspective view showing a retractable roller in an outward position engaging a camera sprocket.
Figure 11:
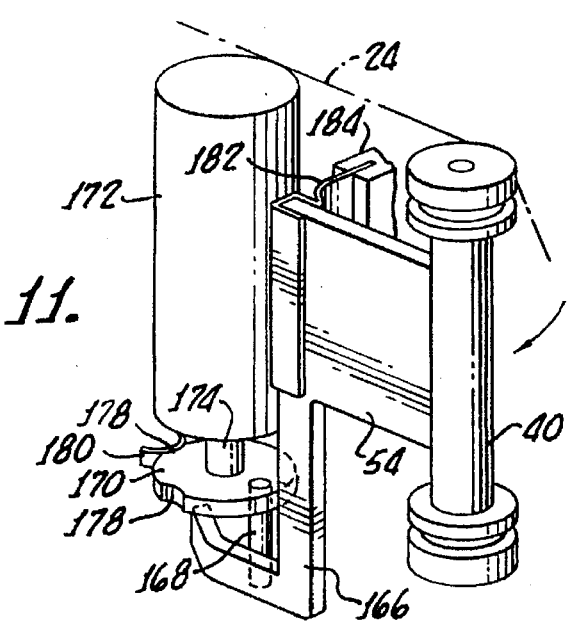
FIG. 11 is a perspective view showing a retracted position of the retractable roller.

Operation of the retractable roller 40 is shown in FIGS. 9-11, FIG. 9 being a cross-sectional view of the roller 40 in both a retracted and an extended position, FIG. 10 being a perspective view showing a roller extended and engaging a camera drive sprocket 46. FIG. 11 shows a retractable roller in a retracted position.

Retraction of the roller 40 is accomplished through the arm 54 which is connected to a lever 166 which engages a pin 168 rotated by a disc 170 by an interconnected motor 172 and shaft 174.

As more clearly shown in FIG. 9, the disc 170 may include a lobe, or detent, 178 for engagement with a spring arm 180 for temporarily stabilizing the position of the disc 170.

When the disc 170 and pin 168 are rotated in a clockwise direction, the retractable roller 40 is outwardly moved through the lever 166, arm 54 into engagement with the film 24 and the camera sprocket 46 to enable the camera sprocket 46 to advance the film 24 through operation of the lever 50.

A spring 182 coupled to the lever 166 at the point of attachment with the arm 54 provides a biasing motion through its engagement with a slot 184 in order to urge the roller 40 into a retracted position, as shown in FIG. 11, when the disc 170 and pin 168 are rotated in a counterclockwise direction.

Although there has been hereinabove described a specific arrangement of a large capacity film magazine in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A waterproof large capacity film magazine for use with an existing camera having a drive sprocket therein for advancing film, the magazine comprising:

an outer magazine housing having large film capacity and having means for removably coupling with an existing camera body having a small film capacity, said existing camera body having a back removed therefrom;

film handling means, disposed in said outer magazine housing, for transporting film across a focal plane of said existing camera body;

retractable roller means for guiding a portion of film against the drive sprocket disposed in the existing camera body; and arm means for moving said retractable roller means to engage the film portion with the drive sprocket when said outer magazine housing engages the existing camera body.

* * * * *